United States Patent [19]

Kafka et al.

[11] Patent Number: 5,577,058
[45] Date of Patent: Nov. 19, 1996

[54] BROADLY TUNABLE SINGLE LONGITUDINAL MODE OUTPUT PRODUCED FROM MULTI LONGITUDINAL MODE SEED SOURCE

[75] Inventors: James Kafka, Mountain View; Vincent J. Newell, Pleasanton; Michael Watts, Union City, all of Calif.

[73] Assignee: Spectra-Physics Lasers, Inc., Mountain View, Calif.

[21] Appl. No.: 305,032

[22] Filed: Sep. 13, 1994

[51] Int. Cl.⁶ ................................................. H01S 3/10
[52] U.S. Cl. ........................... 372/20; 372/94; 372/39; 359/328
[58] Field of Search ............................. 372/39, 20, 93, 372/94, 92, 21, 22; 359/328

[56] References Cited

U.S. PATENT DOCUMENTS 5,390,211  2/1995  Clark et al. .............................. 372/92

OTHER PUBLICATIONS

Y. K. Park, et al., "Single Axial Operation of a Q-switched Nd: YAG Oscillator by Injection Seeding," *IEEE Journal of Quantum Electronics*, vol. QE-20, No. 2, Feb. 1984.

*Primary Examiner*—Leon Scott, Jr.
*Attorney, Agent, or Firm*—Haynes & Davis

[57] ABSTRACT

An oscillator system which produces a single mode output from a multimode seed beam and a multimode optical power source. The seed source employed in the oscillator system produces a multimode seed beam that is used to injection seed a multimode optical power source. The optical power source has a short cavity such that the longitudinal modes of the multimode optical power source are sufficiently spaced apart that a mode of the optical power source can be positioned relative to the multimode seed beam such that the seed beam does not significantly overlap with neighboring longitudinal modes of the optical power source. By positioning a single longitudinal mode to overlap with the seed beam where the seed beam does not significantly overlap with neighboring longitudinal modes of the optical power source, a high energy single longitudinal mode output is produced. The multimode seed beam preferably has a bandwidth, defined as the full width half maximum of the spectral output, of between about 0.025 cm$^{-1}$ and 2.5 cm$^{-1}$. The seed beam most preferably has a bandwidth of about 0.2 cm$^{-1}$. The optical power source should have an optical cavity length that is sufficiently short to cause the longitudinal modes of the multimode optical power source to be sufficiently spaced apart so that the multimode seed beam does not overlap with neighboring longitudinal modes of the optical power source. Since the spacing of the longitudinal modes equals $c/2L$ where c is the speed of light and L is the optical length of the cavity, the optical power source preferably has an optical cavity length less than or equal to about $c/2$ bw where c is the speed of light and bw is the bandwidth of the multimode seed beam. It is preferred that the optical power source have a cavity length of between about 0.2 cm and 20 cm.

26 Claims, 6 Drawing Sheets

BROADLY TUNABLE SINGLE LONGITUDINAL MODE OUTPUT PRODUCED FROM MULTI LONGITUDINAL MODE SEED SOURCE

BACKGROUND OF THE INVENTION

1. Field of the Invention

The present invention relates to an oscillator system such as a optical parametric oscillator or a laser. More specifically, the present invention relates to a tunable oscillator system which produces a single longitudinal mode output.

2. Description of Related Art

Tunable oscillator systems with relatively high output energies and narrow linewidths have a number of scientific and engineering applications. Narrow linewidth gas phase spectroscopy has become important in combustion research and atmospheric monitoring. Tunable oscillator systems which produce a single mode bandwidth over a broad tuning range are ideally suited for these applications.

Most tunable oscillator systems are implemented using lasers, such as dye lasers which are based on gain media dyes, each of which are tunable over a range of 15–100 nanometers. These systems are desirable because of the narrow linewidths and relatively high energy achieved by these systems. However, dye laser systems are cumbersome for applications requiring a wide tunable range because the dye gain medium must be changed as the output is tuned beyond the 15 to 100 nanometer range of the particular dye laser being used.

Optical parametric oscillators (OPO) and amplifiers represent another type of tunable oscillator system. OPO systems are tuned by rotating the angle of the optical gain medium relative to the optical path using servo techniques well known in the art. A variety of optical parametric gain media can be employed in OPOs, such as β-barium borate (BBO), lithium tri-borate (LBO), cesium borate (CBO), and potassium titanyl-phosphate (KTP), each of which provide a different tunable range. OPOs are particularly interesting because of the wide range of tunability which they provide. For instance, tunable ranges from less than 400 nanometers to over about 2500 nanometers have been achieved by OPOs using β-barium borate as the optical gain media.

High power single longitudinal mode outputs have been achieved by injection seeding a single mode seed source into a high power optical power source. The single mode seed sources used to produce a high power single longitudinal mode output are generally too weak to be used by themselves as a single mode output.

For example, Bosenberg, et al., (J. Opt. Soc. Am. B 10 1716–1722 (1993)) employs a tunable single frequency parametric frequency-conversion system in which single frequency pump radiation is obtained from the second harmonic radiation of a 10-Hz commercial Nd:YAG laser that is injection seeded, SLM and flash-lamp pumped. Then, by making the cavity of the seed source OPO very short (5 cm), Bosenberg, et al. produces a narrow OPO bandwidth of approximately 0.02 $cm^{-1}$ which is used as a single longitudinal mode seed source. In order to tune the OPO system of Bosenberg, et al., it is necessary to carefully control the cavity length of the seed source, in addition to the crystal angle and tuning mirror, in order to maintain the production of a single longitudinal mode output over a broad tuning range.

Komine, et al., (Lasers '90; *Proceedings of the 13th International Conference on Lasers and Applications,* San Diego, Calif., Dec. 10–14, 1990, (STS Press, 1991) pp. 612–618) teaches an alternative approach for the production of an OPO bandwidth of less than 0.1 $cm^{-1}$ for use as a single longitudinal mode seed source through the use of an intra-cavity etalon which serves to filter out unwanted modes. Etalons employ wavelength selective coatings which function as a spectral filter to isolate the desired single longitudinal mode output. Because the coatings used in etalons are wavelength selective, multiple optics are required to cover the tunable range of the oscillator system. Etalons also require angle tuning which adds an undesirable level of complexity to the production of a single longitudinal mode output, further encumbering one's ability to employ the single longitudinal mode output in a tunable oscillator system.

Spectral filters have also been used in the production of a single longitudinal mode output for use as a seed beam. For example, Fix, et al. (*Digest on Conference of Lasers and Electrooptics* '94 p. 199–200) employs an extra-cavity etalon as a spectral filter in order to produce a single mode OPO output having a bandwidth of approximately 0.03 $cm^{-1}$. As with the use of etalons, spectral filters, such as the grating used by Fix, et al., add an undesirable level of complexity to the production of a single longitudinal mode output which encumbers one's ability to employ the single longitudinal mode output in a tunable oscillator system.

The requirement that a single longitudinal mode seed source be used to produce a high energy single longitudinal mode output is disadvantageous in view of the complexity associated with producing a single longitudinal mode seed source. As discussed above, limiting the cavity length of the seed source as is taught by Bosenberg, et al. or using intra-cavity etalons, extra-cavity etalons or gratings to filter out a desired single mode seed beam, as is taught by Komine, et al. and Fix, et al., adds an undesirable level of complexity to the oscillator system which greatly limits the ability of these systems to scan over a broad range of wavelengths. It is therefore an object of the present invention to provide a tunable oscillator system which produces a high energy single longitudinal mode output from a multi-mode seed beam.

SUMMARY OF THE INVENTION

The present invention relates to an oscillator system which produces a single mode output from a multimode seed beam and a multimode optical power source. As referred to herein, an oscillator system refers to any oscillator system which produces an optical output and includes, for example, optical parametric oscillator systems and laser systems. The seed source employed in the oscillator system produces a multimode seed beam that is used to injection seed a multimode optical power source. According to the present invention, the optical power source has a short cavity such that the longitudinal modes of the multimode optical power source are sufficiently spaced apart that a mode of the optical power source can be positioned relative to the multimode seed beam such that the seed beam does not significantly overlap with neighboring longitudinal modes of the optical power source. By positioning a single longitudinal mode to overlap with the seed beam where the seed beam does not significantly overlap with neighboring longitudinal modes of the optical power source, a high energy single longitudinal mode output is produced.

The multimode seed beam preferably has a bandwidth, defined as the full width half max of the spectral output, of between about 0.025 cm$^{-1}$ and 2.5 cm$^{-1}$. The seed beam most preferably has a bandwidth of about 0.2 cm$^{-1}$.

The optical power source should have an optical cavity length that is sufficiently short to cause the longitudinal modes of the multimode optical power source to be sufficiently spaced apart so that the multimode seed beam does not overlap with neighboring longitudinal modes of the optical power source. Since the spacing of the longitudinal modes equals c/2L where c is the speed of light and L is the optical length of the cavity, the optical power source preferably has an optical cavity length less than or equal to about c/2bw where c is the speed of light and bw is the bandwidth of the multimode seed beam. It is preferred that the optical power source have an optical cavity length of between about 0.2 cm and 20 cm.

The oscillator system preferably includes an output controller loop which serves to center the longitudinal mode output of the optical power source relative to the center of the seed beam.

The oscillator system of the present invention preferably includes a tuner controller which enables the oscillator system to scan over a series of wavelengths.

Other aspects and advantages of the present invention can be seen upon review of the figures, the detailed description, and the claims which follow.

BRIEF DESCRIPTION OF THE FIGURES

FIGS. 2A–C illustrate the positioning of the multimode seed beam relative to the longitudinal modes of the optical power source wherein

DETAILED DESCRIPTION

The present invention relates to an oscillator system which produces a single mode output from a multimode seed beam and a multimode optical power source. As referred to herein, an oscillator system refers to any oscillator system which produces an optical output and includes, for example, optical parametric oscillator systems and laser systems. A single mode and multimode output refers to a single and multiple longitudinal mode output respectively. The optical power source is referred to as a multimode optical power source because multiple longitudinal modes are generated by the optical power source in the absence of injection seeding. The optical power source has a cavity which has an optical path length. In general, optical path length refers to a physical distance multiplied by the refractive index of the material occupying that distance. Hence, the optical length of the cavity equals the sum of the distances making up the cavity multiplied by the refractive index of each distance. The optical cavity length, as discussed herein, is generally directed to optical power sources with linear cavities which have an optical cavity length L. However, it should be understood that the discussions regarding the optical cavity length of a linear optical power source can be readily adapted to ring optical power sources by substituting $L_R$ for 2L where $L_R$ is the optical cavity length of a ring optical power source.

According to the present invention, the optical power source has a short cavity such that the longitudinal modes of the multimode optical power source are sufficiently spaced apart that a mode of the optical power source can be positioned relative to the multimode seed beam such that the seed beam does not significantly overlap with neighboring longitudinal modes of the optical power source. By positioning a single longitudinal mode to overlap with the seed beam where the seed beam does not significantly overlap with neighboring longitudinal modes of the optical power source, a high energy, single longitudinal mode output is produced.

Figure 1:
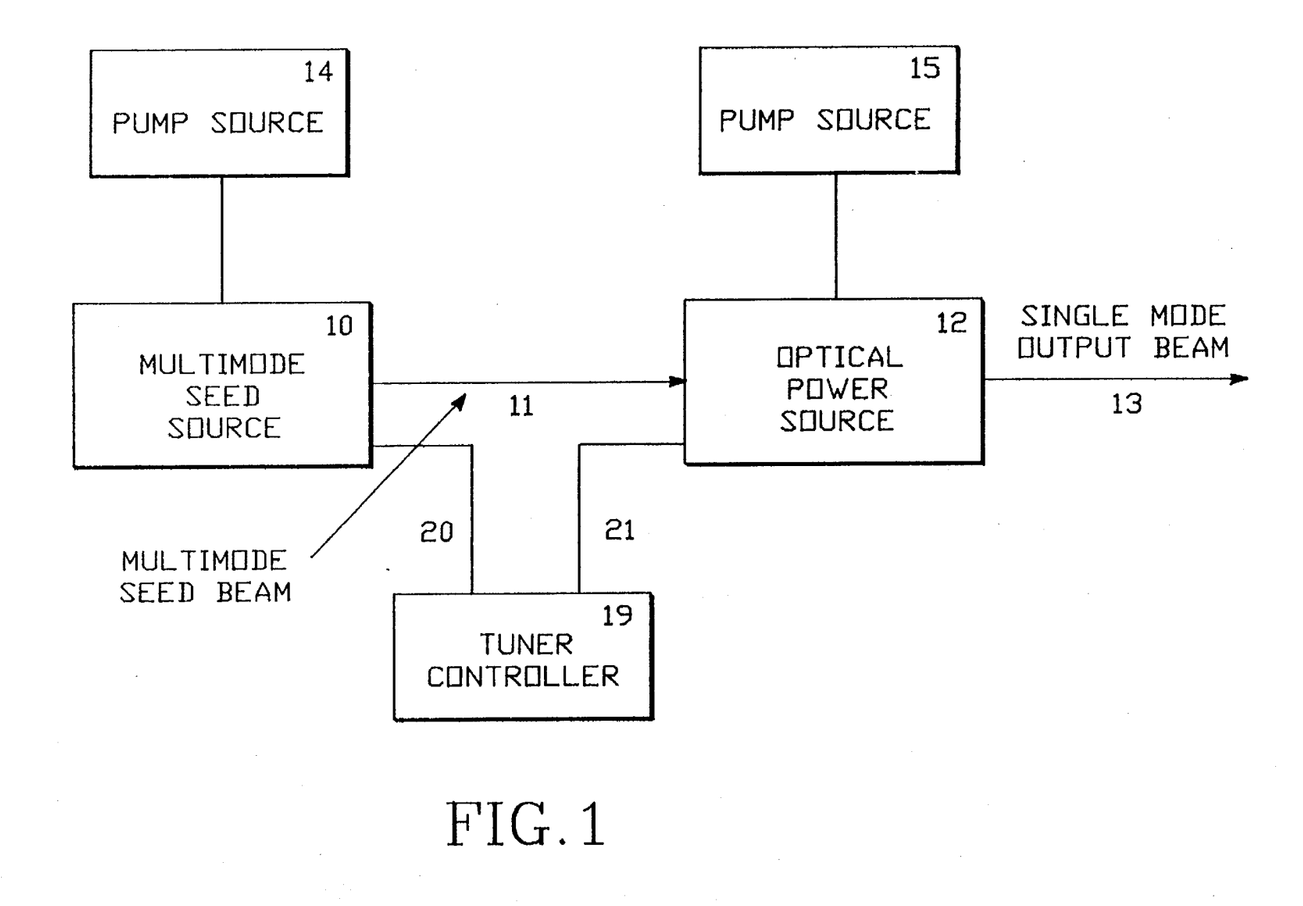
FIG. 1 provides an overview block diagram of the tunable oscillator system of the present invention.

FIG. 1 provides an overview block diagram of the tunable oscillator system of the present invention. The oscillator system includes a multimode seed source 10 which generates a multimode seed beam on line 11. The seed beam is used to injection seed a multimode optical power source 12 which generates a single longitudinal mode output beam 13. The oscillator system also includes a tuner controller 19 connected to the seed source 10 and the optical power source 12 across lines 20 and 21 which cooperatively tunes the seed source 10 and the optical power source 12 to generate an output beam 13 at a selected wavelength. Incorporation of the tuner controller into the oscillator system enables the oscillator system to be tuned over a series of wavelengths.

The tunable oscillator system also includes pump sources 14 and 15 which drive the multimode seed source 10 and the multimode optical power source 12 respectively. Optionally, pump sources 14 and 15 may be a single pump source. When the multimode seed source 10 or the multimode optical power source 12 is an optical parametric oscillator, it is preferred that a single longitudinal mode pump source be used. When the multimode seed source 10 or the multimode optical power source 12 is a laser, either a single or a multimode longitudinal mode pump source may be used. However, when a laser is used, the pump source is preferably a multimode longitudinal mode pump source.

Figure 2:
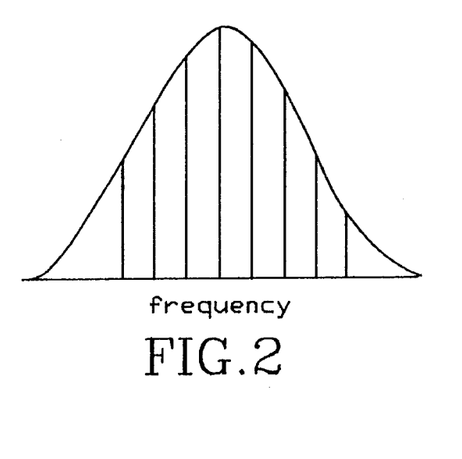
FIG. 2(a) illustrates the situation where the longitudinal mode spacing is too narrow to enable the seed beam to be positioned such that it only overlaps with one longitudinal mode of the optical power source.
FIG. 2(b) illustrates the misalignment of the seed beam relative to one longitudinal mode of the optical power source such that it overlaps with more than one longitudinal mode.
FIG. 2(c) illustrates a multimode seed beam centered upon one of the longitudinal modes of the optical power source where the longitudinal modes are sufficiently spaced apart that the multimode seed beam does not substantially overlap with neighboring longitudinal modes of the optical power source.
Figure 2A:
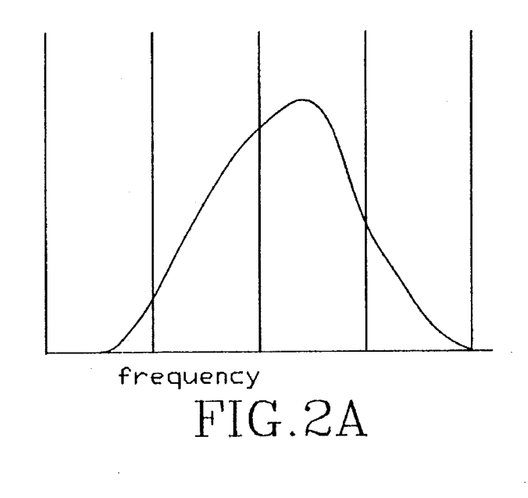
Figure 2B:
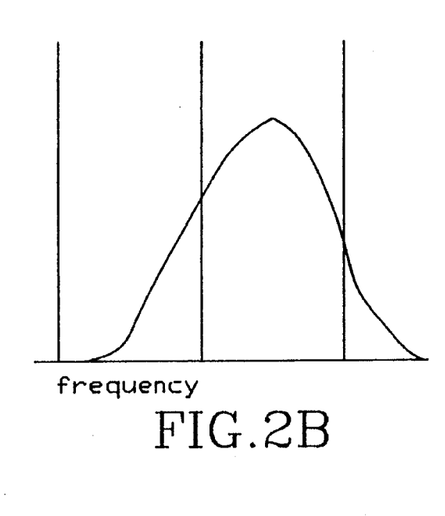
Figure 2C:
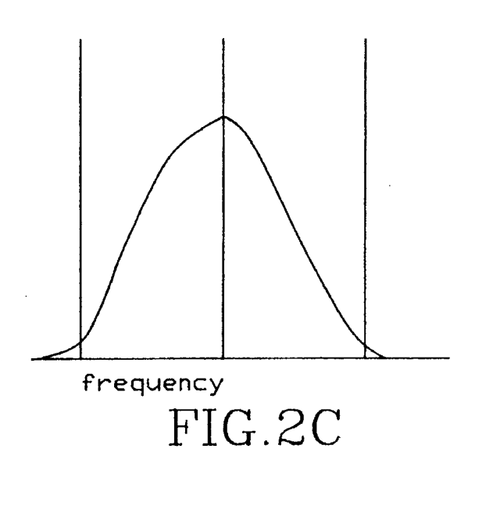

In the oscillator system of the present invention, a single mode output is produced from a multimode optical power source 12 by injection seeding the multimode optical power source 12 with a multimode seed beam 11. The optical cavity length of the optical power source 12 is made sufficiently short to cause the longitudinal modes of the multimode optical power source 12 to be sufficiently spaced apart so that the multimode seed beam 11 does not substantially overlap with neighboring longitudinal modes of the optical power source 12. The seed beam 11 is preferably centered about a particular longitudinal mode of the optical power source. As illustrated in FIG. 2, when the spacing of the longitudinal modes of the optical power source are too narrow to enable the seed beam to be positioned such that it only overlaps with one longitudinal mode of the optical power source (FIG. 2(a)) or when the seed beam is misaligned relative to one longitudinal mode of the optical power source such that it overlaps with more than one longitudinal mode, (FIG. 2(b)), a multimode output is produced. However, if the multimode seed beam is approximately centered upon one of the longitudinal modes of the optical power source and the longitudinal modes are sufficiently spaced apart such that the multimode seed beam does not substantially overlap with neighboring longitudinal modes of the optical power source, a single longitudinal mode output is produced (FIG. 2(c)). As illustrated in FIG. 2(c), it is preferred that the optical power source be adjusted to approximately center the seed beam about one of the longitudinal modes, thereby causing the frequency of the seed beam to approximately equal the frequency of the output beam.

It is believed that the ability of the oscillator system of the present invention to convert a multimode optical power source to a single mode output through injection seeding using a multimode seed beam is related to the physical phenomenon known as injection seeding. Injection seeding refers to the phenomenon by which a single mode seed beam is used to produce a single mode output from an otherwise multimode oscillator. Injection seeding is believed to work by introducing a single mode seed beam which, if the seed beam has sufficient power, enhances that single mode of the optical power source over other modes of the optical power source. Multiple modes are not produced by the optical power source because the single mode seed beam, having only a single mode, is only able to enhance a single mode of the multimode optical power source.

According to the present invention, the individual longitudinal modes of the optical power source are caused to be sufficiently spaced apart so that the multimode seed beam only significantly overlaps with a single mode of the optical power source. By causing the individual longitudinal modes of the optical power source to be sufficiently spaced apart such that the multimodes of the seed beam only overlap with a single mode of the multimode optical power source input, only a single mode of the multimode optical power source input is enhanced by the seed beam, thereby causing the otherwise multimode optical power source to produce a single mode output.

The longitudinal mode spacing of a linear optical power source is equal to $c/2L$ where c is the speed of light and L is the optical cavity length of the optical power source. The longitudinal mode spacing of ring optical power sources is $C/L_R$ where $L_R$ is the round trip optical cavity length of the ring. By making the optical cavity length of the optical power source very short, the individual longitudinal modes of the optical power source can be spaced apart. According to the present invention, the optical cavity length of the optical power source is made sufficiently short such that the longitudinal mode spacing of the optical power source is greater than the bandwidth of the seed beam. As a result, it is possible to position the modes of the optical power source such that only one of the modes of the optical power source overlaps with the multimode seed beam. As a result, only one mode of the multimode optical power source is enhanced.

The bandwidth of the multimode seed beam, defined as the full width half maximum of the spectral output, is preferably between about 0.025 $cm^{-1}$ and 2.5 $cm^{-1}$. The multimode seed beam most preferably has a bandwidth of about 0.2 $cm^{-1}$. Given that the longitudinal mode spacing is $c/2L$ and the mode spacing should be equal to or greater than about the bandwidth of the multimode seed beam, the optical cavity length of the optical power source should have a length equal to or less than $c/2bw$ where c is the speed of light and bw is the bandwidth of the seed beam. The optical cavity length of the optical power source is preferably between about 0.2 cm and 20 cm, most preferably about 2 cm.

When the single longitudinal mode to be enhanced is not centered relative to the multimode seed beam, the frequency of the single mode output will be different than the frequency of the seed beam. Whether the seed beam is centered on one of the longitudinal modes may be evaluated by comparing the frequency of the output beam to the frequency of the seed beam. A shift in the frequency of the output beam to the red indicates that the cavity should be shortened while a shift in the frequency of the output beam to the blue indicates that the cavity should be lengthened. In order to align the single mode output of the optical power source with the multimode seed beam, the optical cavity length of the optical power source may be adjusted. Alternatively, the frequency of the seed beam may be adjusted. An output controller loop for controlling the frequency of the output beam relative to the seed beam is discussed herein with regard to FIG. 5.

With regard to the seed source 10, any oscillator which produces a narrow line output that has a bandwidth less than the longitudinal mode spacing of the optical power source may be used. Examples of suitable oscillators include, but are not limited to, OPOs, dye lasers, diode lasers, Ti:sapphire lasers and neodymium doped lasers.

Figure 3:
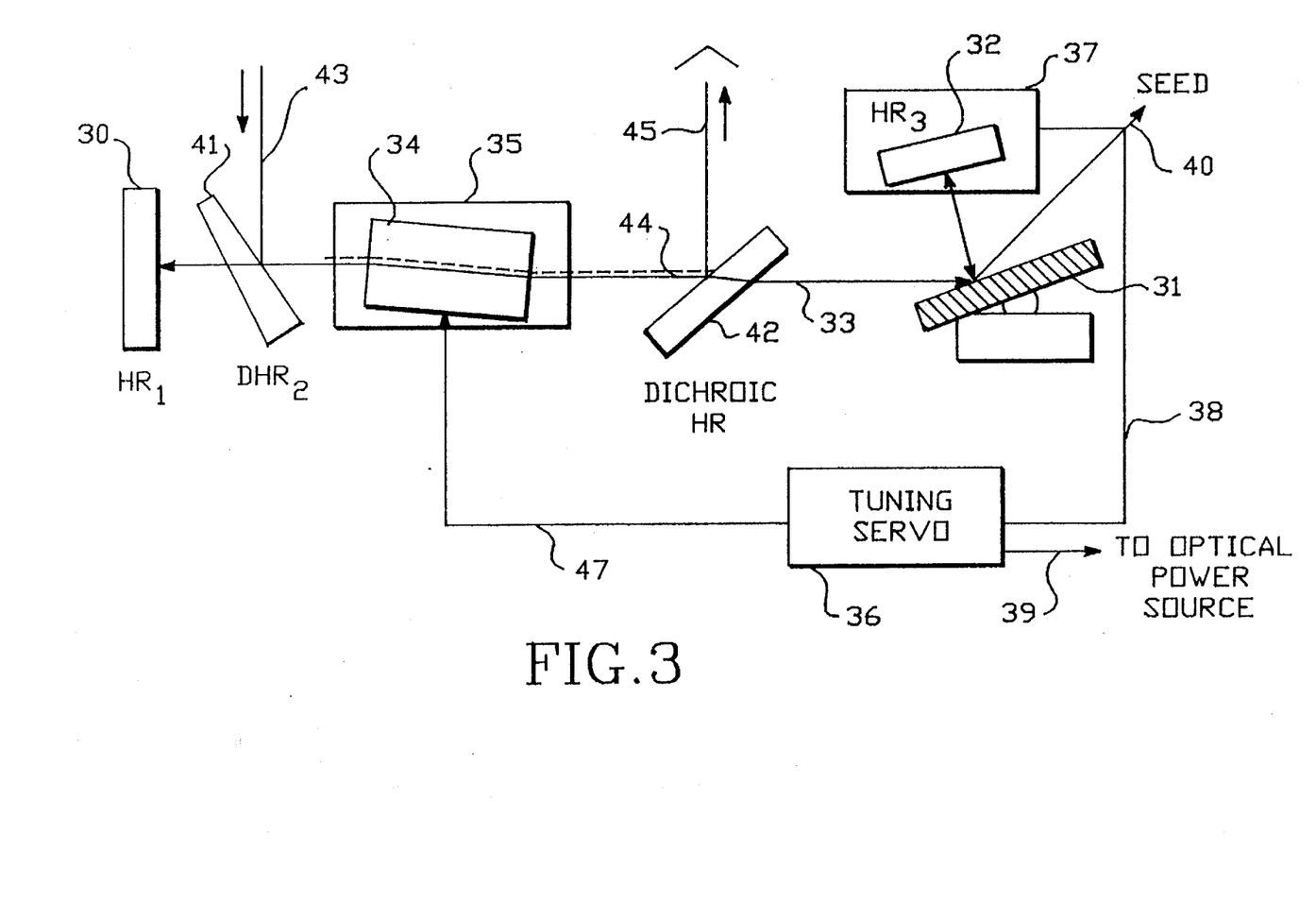
FIG. 3 illustrates a preferred embodiment of the seed source employed in the oscillator system of the present invention.

FIG. 3 illustrates a narrow line OPO as a preferred seed source 10 that may be employed in the tunable oscillator system of the present invention. The narrow line OPO consists of a resonant oscillator OPO cavity defined by high reflector $HR_1$ 30, diffraction grating 31, and high reflector $HR_3$ 32. This resonant oscillator OPO cavity defines an optical path 33 through a gain material 34. The gain material may be any noncentrosymmetric crystal having a non-linear polarizability, wide optical transmission, and a large non-linear coefficient. Examples of suitable gain materials include, but are not limited to β-barium borate, lithium tri-borate, cesium borate, and potassium titanyl-phosphate. The gain material 34 is mounted on an angle tunable mount 35, using techniques well known in the art. The angle of the gain material may be adjusted relative to the optical path either manually or with the aid of a microprocessor using techniques known in the art.

The narrow line OPO is coupled to a tuning servo 36 which tunes the resonant oscillator OPO cavity by rotating the gain material 34 to adjust the phase match angle within the gain material 34, and to rotate the mirror $HR_3$ 32 to keep reflection onto the grating at the correct angle to match changes in wavelength. Thus, the tuning servo is coupled to the angle tunable mount 35 across line 47, and coupled to a controllable mount 37 for the high reflector $HR_3$ 32 across line 38. The tuning servo 36 is also coupled across line 39 to the optical power source 12.

The narrow line OPO illustrated in FIG. 3 includes structure for longitudinally pumping the BBO material 34. This structure includes a dichroic mirror 41 and a dichroic mirror 42. The dichroic mirrors 41 and 42 are preferably transmissive from about 400 nm to 2500 nm. A pump beam is supplied along path 43 into mirror 41 and reflected through the gain material along path 44 to mirror 42 where it is directed out of the cavity. The high reflectors HR1 30 and HR3 32 are broad band visible high reflectors.

The dichroic high reflector 41 is reflective at the pump wavelength at 45 degrees and transmits through the tunable range of the gain material 34. High reflector 42 is reflective at the pump beam wavelength at 45 degrees to direct the pump beam out of the resonant path after a single pass through the gain medium and is transmissive over the tunable range of the gain material 34.

The high reflectors $HR_1$ 30 and grating 31 preferably has 2700 lines (or grooves) per millimeter, optimized for a tuning range of 400 to 700 nm in a single diffraction order. The grating 31 is a wavelength selective element which serves to control the linewidth of the seed beam 40 to less than one wave number (1 $cm^{-1}$), and preferably less than 0.2 $cm^{-1}$. The grating 31 may be controlled either manually or with the aid of a microprocessor using techniques known in the art.

With regard to optical power source, any oscillator may be used as the optical power source in the oscillator system of the present invention provided that the optical cavity length can be made sufficiently short such that the longitudinal mode spacing of the optical power source is approximately equal to or greater than the bandwidth of the seed beam.

Figure 4:
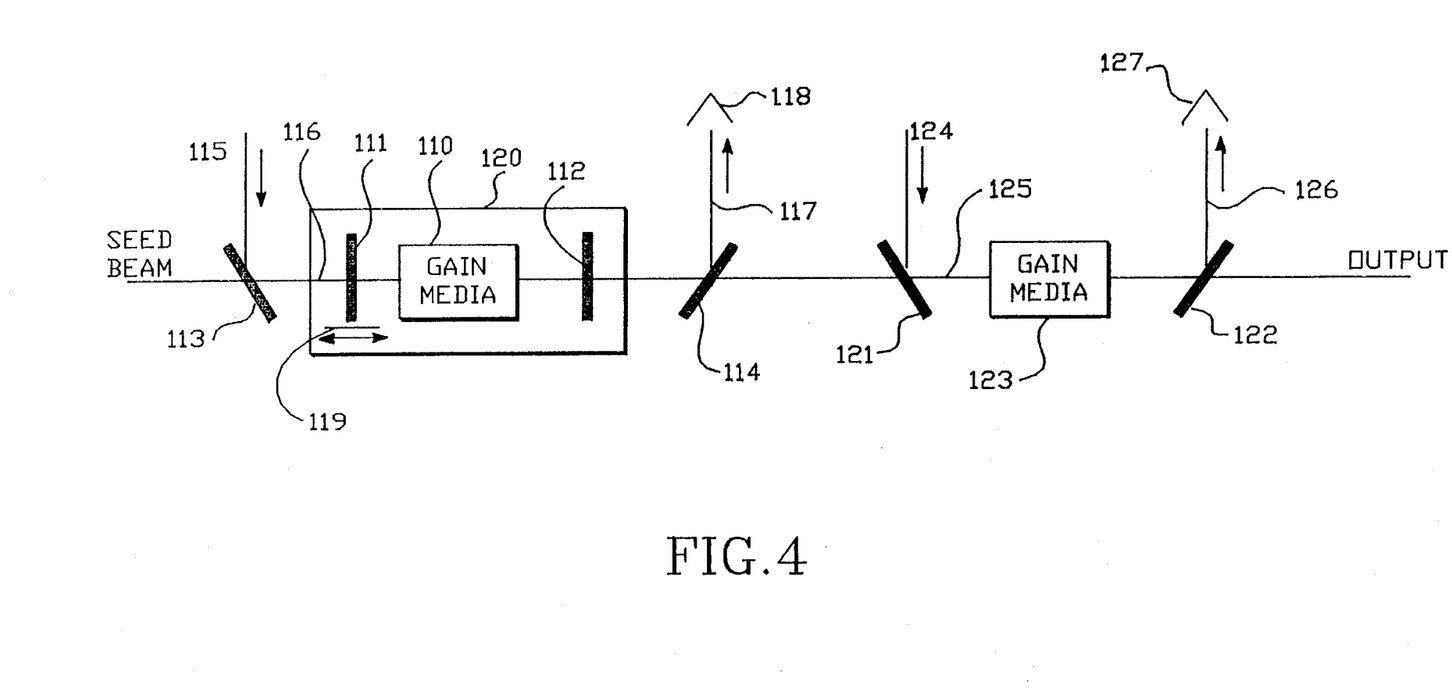
FIG. 4 illustrates a preferred embodiment of the optical power source employed in the oscillator system of the present invention.

A preferred embodiment of the multimode optical power source employed in the oscillator system of the present invention is illustrated in FIG. 4. The optical power source illustrated in FIG. 4 includes an OPO represented by components 110 through 120 and an optical parametric amplifier indicated by components 121 through 127 which may optionally be included.

The optical power source illustrated in FIG. 4 includes a gain medium 110 mounted within a resonator cavity 120 defined by a high reflector 111 and an output coupler 112 where the optical distance between the high reflector 111 and output coupler 112 defines the optical cavity length (L). The output coupler 112 has a reflecting surface facing the high reflector 111. The gain media is preferably an optical parametric gain media. Examples of optical parametric gain media include, but are not limited to β-barium borate, lithium tri-borate, cesium borate, and potassium titanyl-phosphate. It is preferred that β-barium borate be employed as the gain medium.

The multimode optical power source illustrated in FIG. 4 further includes a first input dichroic mirror 113 and a first output dichroic mirror 114 positioned outside the resonant cavity for directing a first pump beam through the parametric gain medium 110. Thus, a pump beam is supplied along path 115 into dichroic mirror 113 which is mounted at −45 degrees to the optical path 116 of the resonator. The pump beam 115 is then directed through the parametric gain medium 110 to dichroic mirror 114 mounted at +45 degrees to the optical path 116. At dichroic mirror 114, the remaining pump beam is reflected along path 117 to a beam blocking mechanism, schematically shown at 118.

As illustrated in FIG. 4, the high reflector 111 is mounted on an adjustable base 119 so that fine adjustments of the optical cavity length can be made. As discussed herein with regard to FIG. 5, the adjustable base may be controlled by an output controller which adjusts the alignment of the one of the longitudinal modes of the optical power source with the seed beam.

In instances where the output generated by an OPO type optical power source is not sufficient, the OPO may be modified to include an unstable resonator coupled with increased pump energy. The unstable resonator provides greater spacial mode selectivity, thereby making it possible to increase the pump energy and, consequently, increase the output energy. An OPO modified to include an unstable resonator is described in U.S. patent application Ser. No. 08/111,083 entitled MASTER OPTICAL PARAMETRIC OSCILLATOR / POWER OPTICAL PARAMETRIC OSCILLATOR, filed Aug. 24, 1993, which is incorporated herein by reference. If an unstable resonator is used, it is preferred to divide the gain into two counter-rotating gain media as described in U.S. Pat. No. 5,047,668 to Bosenberg which is incorporated herein by reference. The two counter-rotating gain media act to preserve the alignment of the optical power source as it is tuned.

Optionally, the optical power source illustrated in FIG. 4 can further include an optical parametric amplifier (OPA) indicated by components 121 through 127. Specifically, the OPA includes a second input dichroic mirror 121 and a second output dichroic mirror 122 positioned outside the resonant cavity for directing a first pump beam through second parametric gain medium 123. Thus, a pump beam is supplied along path 124 into dichroic mirror 122 which is mounted at −45 degrees to the optical path 125. The pump beam 124 is then directed through the parametric gain medium 123 to dichroic mirror 122 mounted at +45 degrees to optical path 125. At dichroic mirror 122, the remaining pump beam is reflected along path 126 to a second beam blocking mechanism, schematically shown at 127.

In a preferred embodiment, the tunable oscillator system further includes an output controller loop which monitors the frequency of the output signal in order to adjust the frequency of one of the longitudinal modes of the optical power source relative to the seed beam. In one embodiment of the output controller loop illustrated in FIG. 5, the output controller loop includes a beam splitter 25 which conveys a portion of the output beam 13 by optical path 27 to seed source 10, an illustration of which is provided in FIG. 6.

Figure 5:
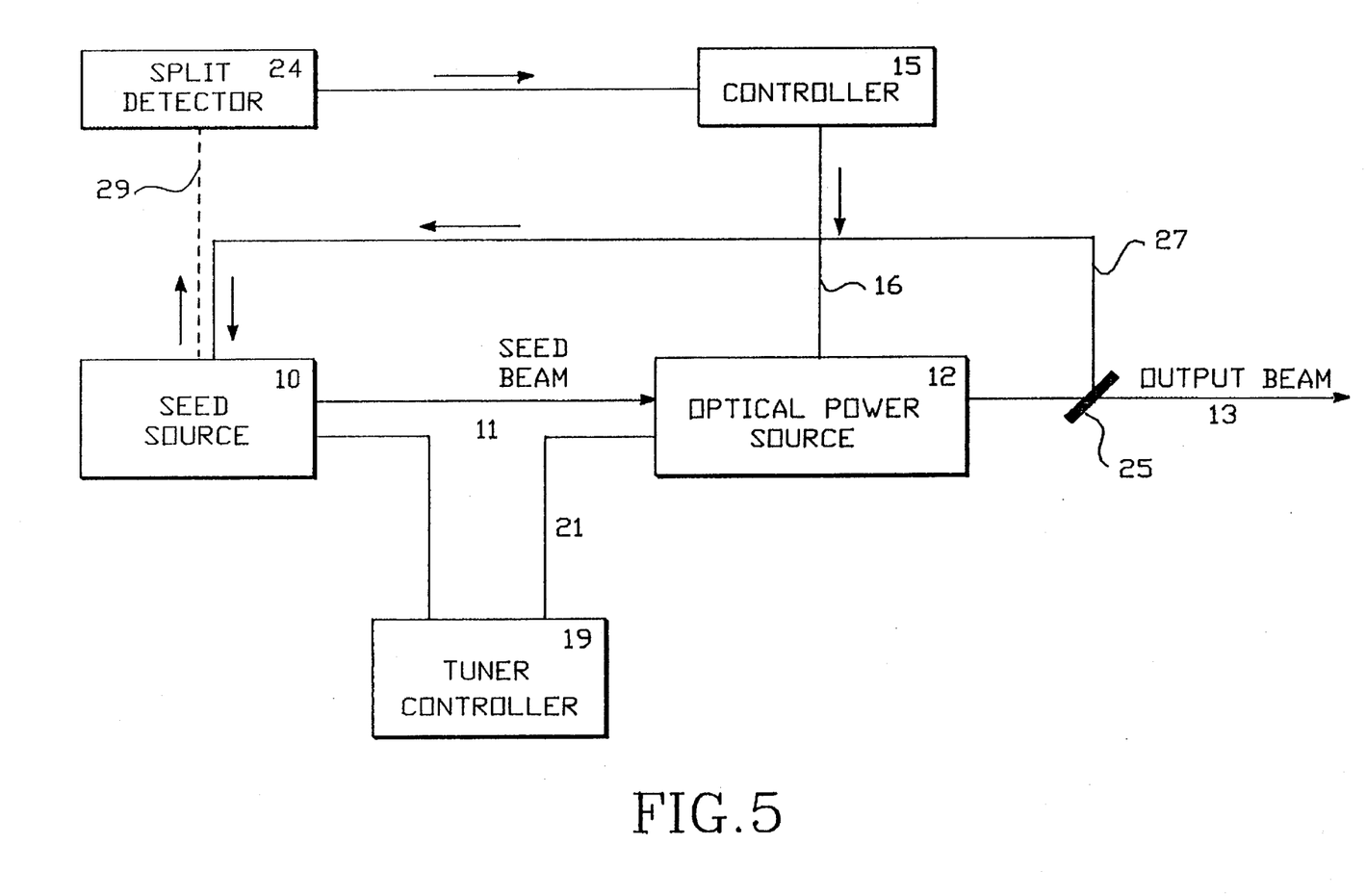
FIG. 5 illustrates an embodiment of the oscillator system of the present invention including an output controller loop for monitoring the frequency of the output beam relative to the seed beam.
Figure 6:
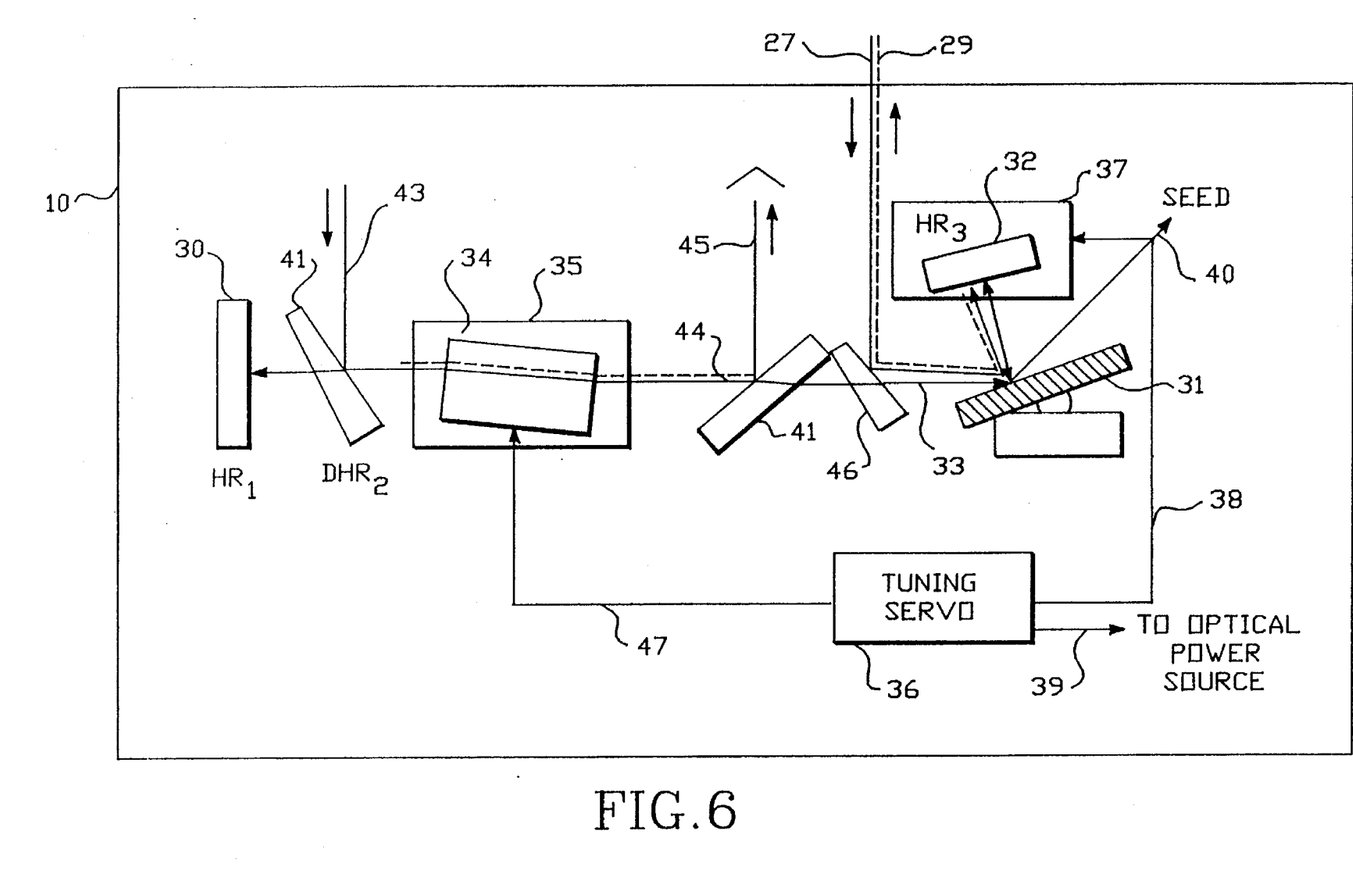
FIG. 6 illustrates the seed source employed with the output controller loop illustrated in FIG. 5.

The seed source illustrated in FIG. 6 is consistent with the seed source illustrated in FIG. 3 with the following additions. The output beam conveyed by optical path 27 enters the seed source and contacts mirror 46 which then conveys the output beam to grating 31 along a path parallel to path 33. The output beam is then reflected off mirror 32, back to grating 31 and returned to mirror 46 in which the output beam exits by optical path 29. The output beam conveyed on optical path 29 is then directed to split detector 24 as shown in FIG. 5. If the frequency of the output beam is not the same as the frequency of the seed beam, the output beam will be physically displaced by its diffraction from grating 31. The angular displacement of the output beam after being diffracted off of grating 31, either positive or negative, indicates whether the frequency of the output beam is greater than or less than the frequency of the seed beam. If the frequency of the output beam equals that of the seed beam, the output beam will not become displaced by diffraction from the grating.

As illustrated in FIG. 5, the split detector 24 monitors whether the output beam, returned by optical path 29 has been positively or negatively angularly displaced. In response, the split detector sends a signal to controller 15 which then sends a control signal by path 16 to optical power source 12 to alter the optical cavity length of the optical power source, thereby adjusting the frequency of the output beam to match the seed beam. Alternatively, the controller can be attached to the tuner controller 19 to modify the frequency of either the seed beam or the optical power source.

Alternative methods for monitoring and matching the frequency of the output beam to the frequency of the seed beam can be envisioned and are intended to fall within the scope of the present invention.

An oscillator system of the present invention was constructed employing an amplified optical power source as described with regard to FIG. 4. Specifically, the gain medium 110 employed was β-barium borate (13 mm, cut at 28°, Type I, AR coated). High reflector 111 had 95% reflectivity. The output coupler 112 had 20% partial reflectivity. The optical cavity length was set to about 2 cm. The pump energy employed was 8 mJ of single frequency energy at 355 nm. The seed beam employed was a multimode beam having a bandwidth of 0.2 $cm^{-1}$. The output beam produced was 2 mJ having a bandwidth of 0.023 $cm^{-1}$.

The output was then amplified by passing the output through an optical parametric amplifier where the gain medium was β-barium borate (13 mm, cut at 28°, Type I, AR coated). Using 220 mJ of single frequency pump energy at 355 nm, the 2 mJ single mode output was amplified to 35 mJ, corresponding to the sum of the power of the signal and idler outputs.

The tunable oscillator system of the present invention obviates the need to use a single mode seed beam to injection seed an optical power source in order to produce a single mode output and, as such, is greatly simplified over prior art tunable oscillator systems. Prior art oscillator systems require a single longitudinal mode seed beam which is generated either by shortening and carefully controlling the cavity of the seed source or by employing a spectral filtering device such as an intra-cavity etalon, an extra-cavity etalon or a grating. All of these approaches for producing a single longitudinal mode seed beam add an unnecessary level of complexity to the oscillator system which impedes the ability of the oscillator system to scan over a range of wavelengths.

By shortening the optical power oscillator in relation to the seed beam according to the present invention, a multimode seed beam may be used to produce a single longitudinal mode output. Because a multimode seed beam is employed in place of a single mode seed beam, the oscillator system of the present invention can scan over a greater number of wavenumbers and at a higher rate. The oscillator system of the present invention should enable more than 100 wavenumbers to be scanned and at a rate in excess of 10 wavenumbers per hour.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An oscillator system producing a single longitudinal mode output, comprising:

a seed source for producing a multimode seed beam; and an optical power source coupled to the seed source and injection seeded by the multimode seed beam to generate an output, the optical power source having a cavity whose optical length is sufficiently short such that the output produced by the optical power source is a single mode output.

2. An oscillator system according to claim 1 wherein the multimode seed beam has a bandwidth between about 0.025 $cm^{-1}$ and 2.5 $cm^{-1}$.

3. An oscillator system according to claim 1 wherein the multimode seed beam has a bandwidth of about 0.2 $cm^{-1}$.

4. An oscillator system according to claim 1 wherein optical power source is a linear optical power source.

5. An oscillator system according to claim 4 wherein the optical cavity length of the linear optical power source is less than or equal to about c/2 bw where c is the speed of light and bw is the bandwidth of the multimode seed beam.

6. An oscillator system according to claim 1 wherein optical power source is a ring optical power source.

7. An oscillator system according to claim 6 wherein the optical cavity length of the ring optical power source is less than or equal to about c/bw where c is the speed of light and bw is the bandwidth of the multimode seed beam.

8. An oscillator system according to claim 1 wherein the optical cavity length of the optical power source is between about 0.2 cm and 20 cm.

9. An oscillator system according to claim 8 wherein the optical cavity length of the optical power source is about 2.0 cm.

10. An oscillator system according to claim 1 wherein the seed source is an oscillator selected from the group consisting of optical parametric oscillators, dye lasers, diode lasers, Ti:sapphire lasers and neodymium doped lasers.

11. An oscillator system according to claim 1 wherein the optical power source is an oscillator selected from the group consisting of optical parametric oscillators, dye lasers, diode lasers, Ti:sapphire lasers and neodymium doped lasers.

12. An oscillator system according to claim 11 wherein the optical power source is an optical parametric oscillator.

13. An oscillator system according to claim 12 wherein the optical power source is an amplified optical parametric oscillator.

14. A tunable oscillator system, comprising:

a seed source for producing a multimode seed beam;

an optical power source coupled to the seed source and injection seeded by the multimode seed beam to generate an output, the optical power source having a cavity whose optical length is sufficiently short such that the output produced by the optical power source is a single mode output; and a tuner controller coupled to the seed source and the optical power source for cooperatively tuning the seed source and the optical power source to select a wavelength of the output beam.

15. A tunable oscillator system according to claim 14 wherein the multimode seed beam has a bandwidth between about 0.025 $cm^{-1}$ and 2.5 $cm^{-1}$.

16. A tunable oscillator system according to claim 14 wherein the multimode seed beam has a bandwidth of about 0.2 $cm^{-1}$.

17. A tunable oscillator system according to claim 14 wherein optical power source is a linear optical power source.

18. A tunable oscillator system according to claim 17 wherein the optical cavity length of the linear optical power source is less than or equal to about c/2 bw where c is the speed of light and bw is the bandwidth of the multimode seed beam.

19. A tunable oscillator system according to claim 14 wherein optical power source is a ring optical power source.

20. A tunable oscillator system according to claim 19 wherein the optical cavity length of the ring optical power source is less than or equal to about c/bw where c is the speed of light and bw is the bandwidth of the multimode seed beam.

21. A tunable oscillator system according to claim 14 wherein the optical cavity length of the optical power source is between about 0.2 cm and 20 cm.

22. A tunable oscillator system according to claim 21 wherein the optical cavity length of the optical power source is about 2.0 cm.

23. A tunable oscillator system according to claim 14 wherein the seed source is an oscillator selected from the group consisting of optical parametric oscillators, dye lasers, diode lasers, Ti:sapphire lasers and neodymium doped lasers.

24. A tunable oscillator system according to claim 14 wherein the optical power source is an oscillator selected from the group consisting of optical parametric oscillators, dye lasers, diode lasers, Ti:sapphire lasers and neodymium doped lasers.

25. A tunable oscillator system according to claim 24 wherein the optical power source is an optical parametric oscillator.

26. An oscillator system according to claim 25 wherein the optical power source is an amplified optical parametric oscillator.

* * * * *